US007659487B2

(12) United States Patent
Conard et al.

(10) Patent No.: US 7,659,487 B2
(45) Date of Patent: Feb. 9, 2010

(54) DATA CONTROLLED MAIL COLLATION SYSTEM

(75) Inventors: Walter S. Conard, Lake Villa, IL (US); Daniel J. Parenti, Chicago, IL (US); Richard J. Wojdyla, Wadsworth, IL (US)

(73) Assignee: Bowe Bell + Howell Postal Systems Company, Wheeling, IL (US)

( * ) Notice: Subject to any disclaimer, the term of this patent is extended or adjusted under 35 U.S.C. 154(b) by 489 days.

(21) Appl. No.: 11/150,295

(22) Filed: Jun. 13, 2005

(65) Prior Publication Data

US 2006/0102531 A1 May 18, 2006

Related U.S. Application Data

(60) Provisional application No. 60/626,861, filed on Nov. 12, 2004.

(51) Int. Cl.
*G06K 9/00* (2006.01)
*G06F 7/00* (2006.01)

(52) U.S. Cl. ....................... 209/584; 700/224; 700/226; 700/227; 209/900

(58) Field of Classification Search ................. 700/224; 386/46; 209/900
See application file for complete search history.

(56) References Cited

U.S. PATENT DOCUMENTS 4,627,540 A * 12/1986 Takeda ....................... 209/555
6,389,327 B1 * 5/2002 Thiel .......................... 700/227
6,445,975 B1 * 9/2002 Ramsey ...................... 700/226
6,598,748 B2 * 7/2003 Mileaf et al. ................ 209/542
6,732,012 B2 * 5/2004 Hendrickson et al. ....... 700/224

(Continued)

FOREIGN PATENT DOCUMENTS

NL 7 310 644 A 2/1975

(Continued)

OTHER PUBLICATIONS

English translation of previously submitted WO 2005/053864, filed May 22, 2006; English translation entitled: Method for Sorting Addressed and Unaddressed Mail Items, pp. 1-16 with Figures 1-5 (3 pages).

(Continued)

*Primary Examiner*—Patrick H Mackey
*Assistant Examiner*—Terrell H Matthews
(74) *Attorney, Agent, or Firm*—McDermott Will & Emery LLP

(57) ABSTRACT

Today, high density mailings such as "marriage mail," Advo type advertisements, saturation mail, periodicals, and catalogs often require manual handling by the postal authority. Other than saturation mailings, where every carrier stop gets the same article, these items must be addressed. Verification of production is often desired due to spoilage and damage during production, which requires rework by the mailer. The addition of a data controlled mail collation feeder to existing or new Postal Authority automation equipment or the like eliminates the need to manually handle these difficult mail types and eliminates the need to address specific items. The manual casing at the delivery is eliminated. The data processing system that controls the data controlled mail collation feeder will also perform delivery confirmation and may assess postage due.

9 Claims, 6 Drawing Sheets

U.S. PATENT DOCUMENTS

| | | | | |
|---|---|---|---|---|
| 6,741,908 | B2 | 5/2004 | Vanderbles et al. | |
| 6,748,294 | B1 * | 6/2004 | Overman et al. | 700/224 |
| 7,012,211 | B2 * | 3/2006 | Brinkley et al. | 209/584 |
| 7,112,756 | B2 * | 9/2006 | Hanson | 209/584 |
| 2002/0139726 | A1 * | 10/2002 | Roth et al. | 209/584 |
| 2004/0153208 | A1 | 8/2004 | Wilke | |
| 2004/0186616 | A1 | 9/2004 | Overman et al. | |
| 2005/0067331 | A1 | 3/2005 | De Leo et al. | |

FOREIGN PATENT DOCUMENTS

| | | | |
|---|---|---|---|
| WO | WO 2004/067193 | A | 8/2004 |
| WO | WO 2005/053864 | A | 6/2005 |

OTHER PUBLICATIONS

European Search Report issued in European Patent Application No. 05 024 231.2-2307, mailed Jul. 17, 2009.

* cited by examiner

DATA CONTROLLED MAIL COLLATION SYSTEM

RELATED APPLICATIONS

This application claims the benefit of U.S. Provisional Application No. 60/626,861 Filed Nov. 12, 2004 entitled "Data Controlled Mail Collation System," the disclosure of which also is entirely incorporated herein by reference.

TECHNICAL FIELD

The present subject matter relates to techniques and equipment to sort mail and insert or collate into the sorted mail items of types that often are difficult to sort automatically, such as flats, so as to automatically include such items in grouping of mail pieces for individual mail stops in stop-sequence sorted mail, where the addition of the flats is based on collation instruction data.

BACKGROUND

The processing of mail for delivery is increasingly being performed by automatically controlled and operated machinery, which sorts mail pieces in accordance with the intended destination of each piece for ease and efficiency of delivery to specific delivery points or stops along a mail carrier's route. For this purpose, sorting equipment has been developed that sorts regular mail pieces into a sequence corresponding to the delivery route used by the mail carrier for delivery to individual addresses. Existing equipment has become quite effective in processing regular mail, and recent enhancements are beginning to enable some automated processing of pieces such as flats that were difficult to handle.

With the advent of the Flats Sequencing System (FSS) and Delivery Point Packaging (DPP) equipment to the Postal Authority automation program, new possibilities become practical for automation of "marriage mail," Advo type advertisements, saturation mail, periodicals, catalogs and a variety of other mailings that are not unique to the delivery point (i.e. all recipients receive the same item). Today much of this mail in still manually cased by the carrier, since it is not "automation friendly." Other items, with a large distribution such as periodicals must be addressed, sorted and packaged in bundles for delivery to the Postal Authority on pallets. These bundles must be broken down and collated with similar items either manually at the Delivery Unit (DU) or on flats sorting machines. At the mail manufacturing plant, a considerable amount of logistics is required and considerable expense is associated with addressing and accounting for spoilage due to equipment jams on the bindery lines and in other manufacturing steps. Postage accountability, presort rules, and barcode quality are all significant challenges for these mail types.

Further improvements in the techniques for automatically handling such flats mailings, as part of or in association with the sequence sorting, would further improve postal automation and efficiency and could present new revenue opportunities.

SUMMARY

Hence, further improvements in flat mail processing are proposed, that involve automated handling of the flats based on received instructions, separate from any material included in or printed on the flats.

A method of sorting mail and collating flats to form stop-sequence mail for a mail carrier involves receiving flats for delivery to mail stops on a delivery route of the mail carrier and receiving collation instructions regarding desired delivery of the flats, separate from any material included in or printed on the flats. Mail is automatically sorted in stop-sequence order for mail stops on the delivery route. The sorted stop-sequence mail includes a grouping of one or more mail pieces intended for delivery to each of a number of the mail stops on the delivery route of the mail carrier. The method also entails automatically adding the flats during sorting of the mail. The flats are added so as to include one of the flats in each of a number of the groupings of the sorted stop-sequence mail, based on the received collation instructions.

Other flats may be added to the groupings in a similar manner, in response to a second set of collation instructions. Flats or flat mail that may be processed in this manner, as defined as FSM 881 automation mail in the Domestic Mail Manual, ranges from four to fifteen and three-quarters inches in length, from four to twelve inches in width, and from 0.007 to 1.25 inches thick, weighing from 0.01 to 6 pounds. The types of mail in the flat category include, but are not limited to: catalogs, magazines or other periodicals (with or without sleeves or polywrap), newspapers, advertisement packages, padded envelopes, envelopes, single sheet flyers, and compact disks. For the purposes of this specification, all letters and envelopes that fit within the dimensional criteria above are included and are referenced as flats in this specification. In addition, the amount of postage affixed or the class of postage affixed does not limit the mail characteristics covered in this specification.

Examples disclosed provide both Delivery Point Packaging (DPP) and Flats Sequencing System (FSS) type sorting. In a DPP example, the automatic sorting of the mail comprises forming a bundle of mail, as the grouping intended for delivery to each of the mail stops. The adding of flats involves automatically inserting one of the flats into the bundle for each of the groupings of the sorted stop-sequence mail.

In the FSS example, the automatic sorting of the mail comprises receiving a stream of mail including mail pieces for a number of routes and sequence sorting mail from the stream to produce the sorted stop-sequence mail. The addition of flats then involves automatically inserting flats into the stream of mail in such a manner that the sequence sorting of the stream automatically adds one of the flats in each of the plurality of the groupings in accord with the received collation instructions. The stream of mail may include other flats that are not processed based on collation instructions and/or other non-flat mail types.

The sequence of the groupings can be any arbitrary sequence that may be desirable for the carrier. Examples include walk sequence order and linear route sequence order.

From another perspective, the present disclosure teaches a method of automatically controlling mail processing. This method entails receiving collation instructions regarding desired delivery of flats to mail stops on a delivery route of a mail carrier. The received instructions are separate from any material included in or printed on the flats. The instructions are used to control an automatic feeder that supplies the flats to an automatic sorting system. The control causes the feeder to add the flats during sorting of the mail, so as to add one of the flats in each of a plurality of groupings of the sorted stop-sequence mail.

Aspects of this control method may be implemented in a programmed computer system or embodied in a software product. The software product comprises executable instructions for causing a computer to perform the method, and a machine readable medium bearing the instructions.

In the above discussed sorting and control methodologies, the control of the addition of the flats is based on the separate instructions, rather than on address or other information on the flats, which allows the postal authority or other party that performs the sorting to develop new services around delivery of the flat mail pieces. For a saturation mailing example, the instructions produce an automatic addition of one of the flats into a grouping for every one of the mail stops on the carrier's delivery route. In another example, the collation instructions identify a sub-set but not all of the mail stops on the carrier's route; and the adding step places one of the flats into each grouping of mail intended for delivery to a respective mail stop in the sub-set identified by the instructions. In any of these examples, addresses of intended destinations are omitted from the flats.

The use of the collation instructions to control the processing with regards to the flats also offers additional delivery control and integrity. In the example where the instructions include addresses for a sub-set of the mail stops, the addresses in the instruction file can be validated before being applied to control the processing of the flats. The address processing may also facilitate automatic delivery at a new locations. For example, if an address in the received instruction file is for a resident that has moved to a new location, the processing may identify an address of the resident at the new location. This enables forwarding of an instruction to a remote facility, at which a flat is added into a grouping for delivery at the new location by another mail carrier, that is to say without physically forwarding one of the flat articles to the remote processing location.

The control of the automatic addition of the flats also may facilitate tracking the number of the flats added into the groupings of mail. The number of the flats added into the groupings of mail, for example, may be reported to a mailer of the flats, to provide the mailer a verification of delivery. As another example, postage charged for delivery of the flats can be based on the number of the flats actually added into the groupings of mail.

Those skilled in the art will recognize that these teachings may be embodied in various equipment for sorting mail and/or adding flats to so as to include the flats in the appropriate groupings of sorted stop-sequence mail or in software for controlling such operations.

For example, a data controlled mail processing system comprises a sorting system, a feeder and a controller. The sorting system automatically sorts mail in stop-sequence order for mail stops on a delivery route of the mail carrier. The sorted stop-sequence mail comprises a grouping of one or more mail pieces intended for delivery to each of a plurality of the mail stops on the delivery route of the mail carrier. The feeder feeds flats to the sorting system, and the controller controls operations of the feeder in response to the delivery instructions. For example, the controller causes the feeder to supply the flats to the sorting system in such a manner as to enable automatic addition of one of the supplied flats into each of a plurality of the groupings of mail, based on the delivery instructions. In disclosed examples of such equipment, the sorting system comprises a Delivery Point Packaging (DPP) system or a Flats Sequencing System (FSS).

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
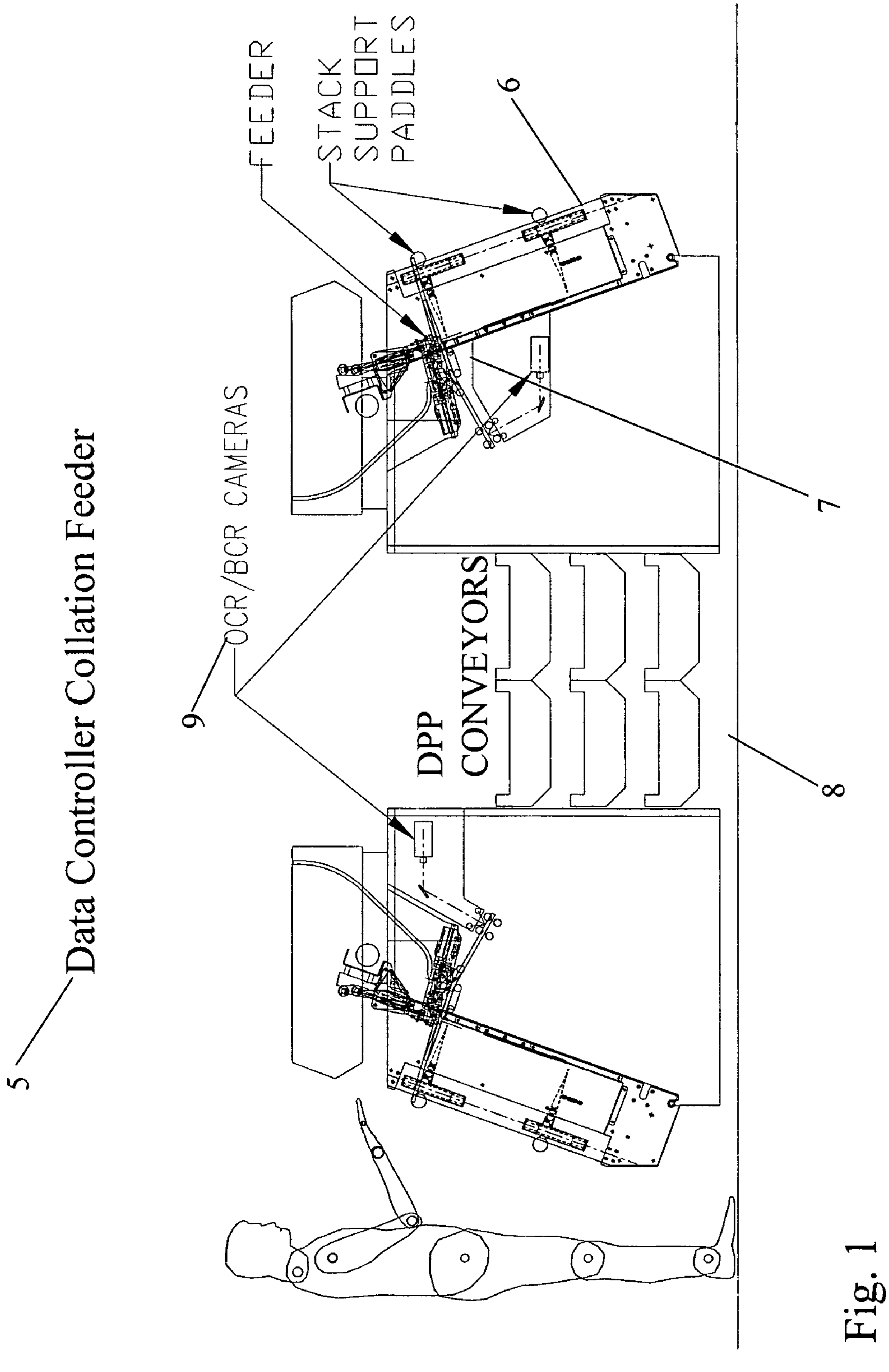
FIG. 1 shows the collation feeder system, used in the Delivery Point Packaging (DPP) examples.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The techniques discussed below sort mail and collate flats, to form stop-sequence mail for a mail carrier containing flats together with other mail pieces. The flats processing is responsive to separately received collation instructions, without the need to read information from the flats. In many cases, the flats need not be individually addressed.

As discussed with regard to the examples, sorted stop-sequence mail for each delivery route includes a grouping of one or more mail pieces intended for delivery to each of a number of the mail stops on the particular delivery route. The processing automatically adds the flats during sorting of the mail into stop-sequence order, in such a manner that one of the flats is included in each of a number of the groupings of each delivery route, based on the received collation instructions. The sequence of the groupings can be any arbitrary sequence that may be desirable for the carrier. Examples include walk sequence order and linear route sequence order.

To implement such processing, a data controlled mail processing system example comprises a sorting system, a feeder and a controller. The sorting system automatically sorts mail in stop-sequence order for mail stops on a delivery route of the mail carrier. Typically, the system performs these sorting operations for a large number of mail routes. The feeder feeds flats to the sorting system, and the controller controls the feeder in response to delivery instructions. For example, the controller causes the feeder to supply the flats to the sorting system in such a manner as to enable automatic addition of one of the supplied flats into each of a plurality of the groupings of mail, based on the delivery instructions.

To fully understand the present teachings, reference now is made in detail to the examples illustrated in the accompanying drawings and discussed below.

Collation Feeder Technology

Flats or flat mail, defined as FSM 881 automation mail in the Domestic Mail Manual, ranges from four to fifteen and three-quarters inches in length, from four to twelve inches in width, and from 0.007 to 1.25 inches thick, weighing from 0.01 to 6 pounds. The types of mail in the flat category include, but are not limited to: catalogs, magazines or other periodicals (with or without sleeves or polywrap), newspapers, advertisement packages, padded envelopes, envelopes, single sheet flyers, and compact disks. For the purposes of this specification, all letters and envelopes that fit within the dimensional criteria above are included and are referenced as flats in this specification. In addition, the amount of postage affixed or the class of postage affixed does not limit the mail characteristics covered in this specification.

To facilitate the improvements in flat mail processing during stop sequence sorting discussed herein, the examples use a feeder system that can handle all these types of flat mail with very high reliability, no doubles and no damage and can be controlled by a programmed computer or the like. The Flats Bundle Collator (FBC) feeder developed and tested for the Postal Authority in an operational environment is well suited for this function, with appropriate modifications. The FBC technology and its feeder system are described in U.S. Pat. No. 6,748,294 and in continuation application Ser. No. 10/815,683, which are incorporated herein by reference. Those skilled in the art will recognize, however, that other flats feeder systems may be used.

Examples of sorting equipment disclosed provide both Delivery Point Packaging (DPP) and Flats Sequencing System (FSS) type sorting. In a DPP example, the automatic sorting of the mail forms a bundle of mail, as the grouping intended for delivery to each of the mail stops. The adding of flats involves automatically inserting one of the flats into the bundle for each of the plurality of the groupings of the sorted stop-sequence mail. In the FSS example, the automatic sorting of the mail comprises receiving a stream of mail including mail pieces for a number of routes and sequence sorting mail from the stream to produce the sorted stop-sequence mail. The addition of flats then involves automatically inserting flats into the stream of mail in such a manner that the sequence sorting of the stream automatically adds one of the flats in each of the plurality of the groupings in accord with the received collation instructions. The application of this Collation Feeder 10 and 16 to the final collation stage of the DPP or as part of the sequence sorting operation, for example in FSS, will enable various innovations and introduce new services for the Postal Authority to offer to its key customers.

These high density mail types are difficult mail to feed and transport, therefore they must be added to the collated and sequenced mail at the last possible point before the delivery point package is created or the carrier delivery mail tub is filled. This will significantly reduce machine jams and mail damage.

Figure 5:
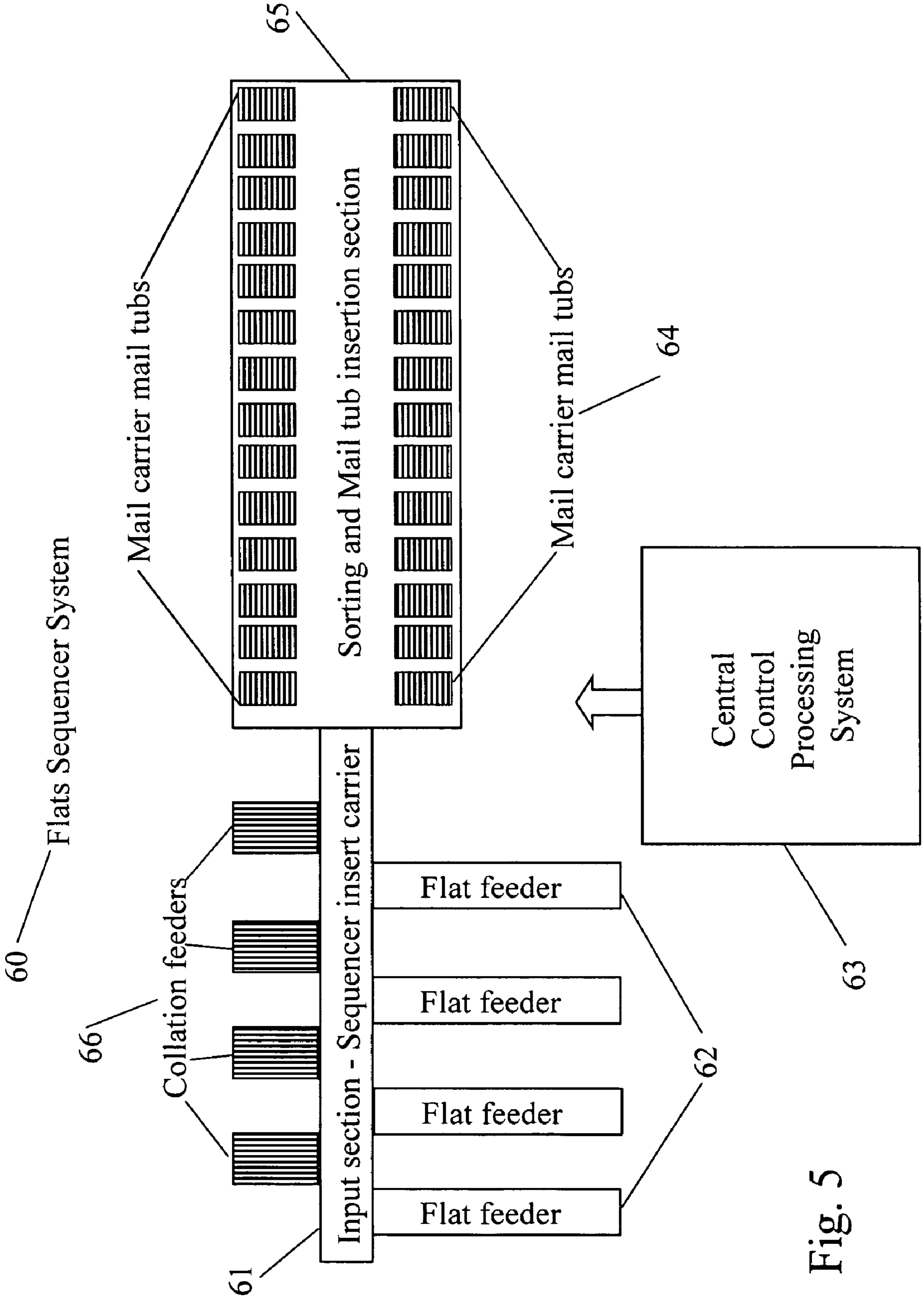
FIG. 5 shows an alternate approach to data controlled mail collation using a sequencing/sorting machine, such as a Flats Sequencing System (FSS).

The number of Collation Feeders 5 needed is determined by the number of qualifying mail types needed to be collated for a given DU. Numerous feeders can be distributed along the DPP collation track 14 (FIG. 2) or on the FSS input section 61 (FIG. 5). The Collation Feeder is equally suited to process the full range of letter and flat mail. This process also is applicable to the FSS on final pass of the sequencing run for an individual carrier.

For purposes of discussion, we will first consider data controlled collation or insertion of flats in the context of DPP, after which we will discuss application of the processing to FSS. Those skilled in the art will recognize, however, that the present teachings may be applied to other types of sequence sorting that may involve addition of flat mail pieces into the mail stop groupings.

Data Controlled Insertion for DPP

Figure 2:
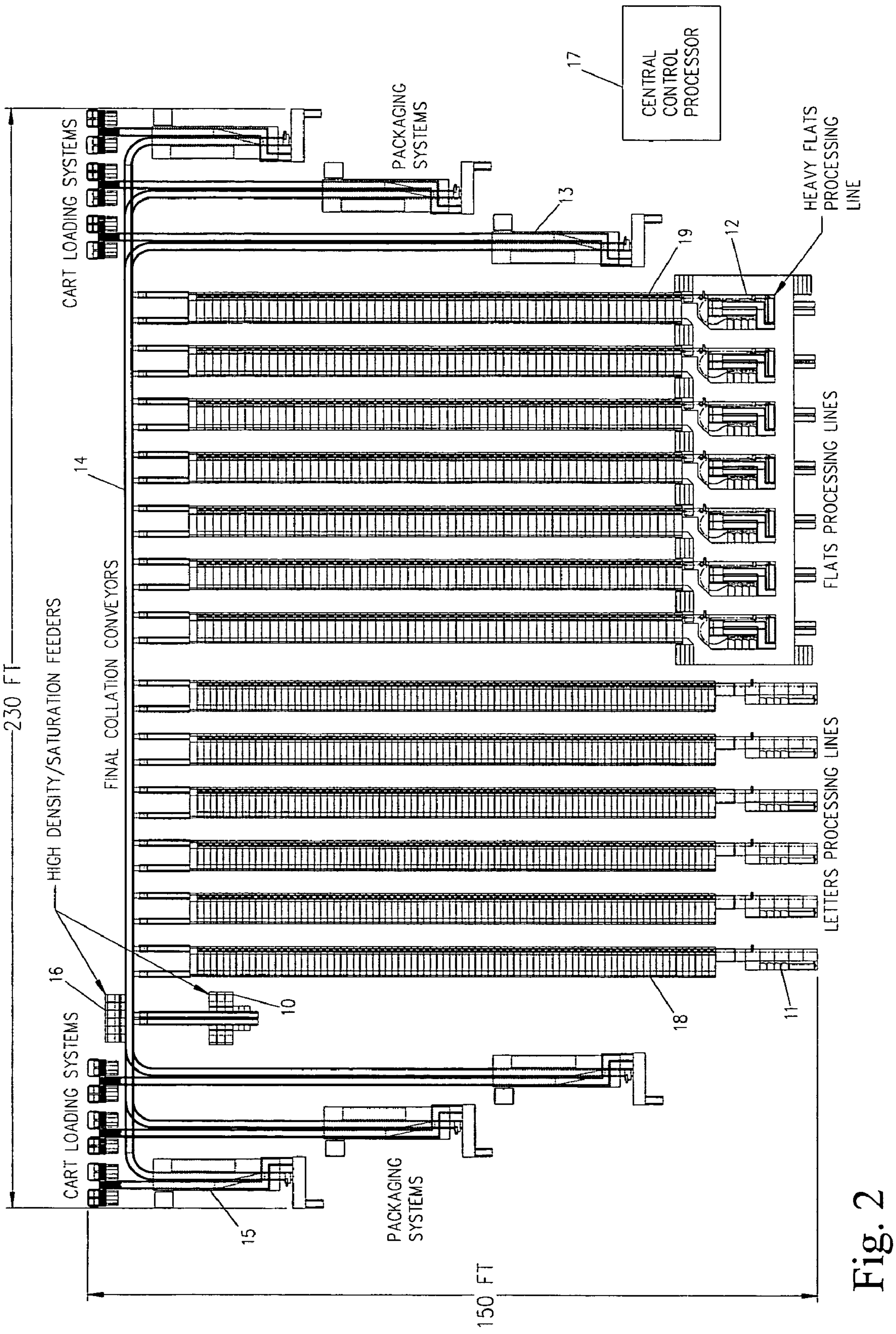
FIG. 2 is a schematic of the a possible implementation of the DPP system showing the inclusion of the collation feeders.

The DPP concept (FIGS. 1 and 2) incorporates the Collation Feeder at the end of the collation track 14 at location 16 or on a collation subsystem 10 (FIG. 2). This is the point where the addressed mail has been collated and is on the conveyer system in carrier walk sequence. The data system has tracked each bundle of sequenced mail and therefore knows when each stop is at the insertion position for the Collation Feeder. Insertion control onto the collation track is then based on the type of mail loaded in the feeder and the delivery requirements specified in the instructions for that flat mail.

Collation Feeders for DPP

The collation feeder 5 shown in FIG. 1 is designed to handle mail types that are difficult is handle in automation equipment. It uses a near vertical mail magazine 6 coupled with a top feeder mechanism 7 that removes the mail item from the top of the stack. In the example, such magazines and feeder mechanisms are shown on opposite sides of the conveyors 8 of a DPP system, although the feeders 5 may be used in either DPP, FSS or in other applications. In the illustrated example, the feeder system 5 inserts the required flat mail piece onto a collation conveyer 8 under control of the central processor 17 (FIG. 2). The collation feeder technology is described in U.S. Pat. No. 6,748,294 and in continuation application Ser. No. 10/815,683.

The purpose of the collation feeders is to feed flats, for saturation mailings or the like, directly into collation conveyor pockets without processing the mailings through the racking modules of the processing lines. The collation feeders provide the benefit of reducing the quantity of racking modules required, which reduces the overall footprint of the DPP machinery. There are two types of collation feeders available for each conveyor line. One type is for card stock and very thin envelopes, while the other type is for marriage mailing advertisement packages, periodicals and catalogs. As an option, it is possible to place more than one of each type on each conveyor line. The cycle rate of the saturation feeders will match the cycle rate of the collation conveyors, which will range from 2 to 3 pockets per second. As discussed later, each flat collation feeder is controlled by a computer, based on collation instructions regarding a particular group or batch of flats.

Barcode readers and/or Optical Character Readers (BCR/OCR) 9 may be included for reading addressed pieces, e.g. for occasions when the data control option is not used or for quality control. The OCR/BCR system 9 reads barcodes and/or addresses from mail pieces, if provided. The information read from addressed mail pieces may be used to verify that mail pieces are being processed in delivery point sequence order and injected into the correct collation conveyor pockets if the data controlled insertion is not in use. If the OCR/BCR system detects that mail pieces are out of sequence, the mail pieces will be diverted from the collation conveyor 8 before they are transferred to the packaging system.

Delivery Point Packaging (DPP)

The Delivery Point Packaging (DPP) system is depicted in FIG. 2. Numerous variations on the layout shown are possible without affecting the viability of the invention. The system consists of letter feeders 11, flat and heavy item feeders 12 that input mail pieces into the letter racking system 18, and a flat racking system 19. The DPP system is designed to process all of the mail for a given Delivery Unit (DU) at one time and output delivery stop packages in carrier walk sequence for each carrier that operates from the DU. The DPP must also accommodate saturation mail, periodicals and catalogs that are commonly hand sorted by the carrier before the delivery route is started. This mail could be processed on the regular flat feeders 12, but significant mail damage would occur with these feeders plus, the address must be read in order to properly place the item in the correct delivery package. The use of data controlled collation feeders located on the output section of the conveyer 14 where delivery point packages are assembled makes it possible to insert these mail pieces with a feeder specially designed to handle these mail types. The feeders can be located in a separate group 10 and merged with the main collation conveyer 14, or they may be placed along the main conveyer 14 at location 16. In the schematic shown, the collation feeders 10 or 16 would be located before either of the packaging systems 15 and 13.

A central control processor 17 controls the entire DPP process. This processor may be implemented as a distributed group of processors that perform sub functions that are coordinated over a network versus a single large processor. The processor performs the tracking of every mail piece in the systems and controls the extraction of mail pieces out of the racking systems 18 and 19 to form the delivery point packages.

Figure 3:
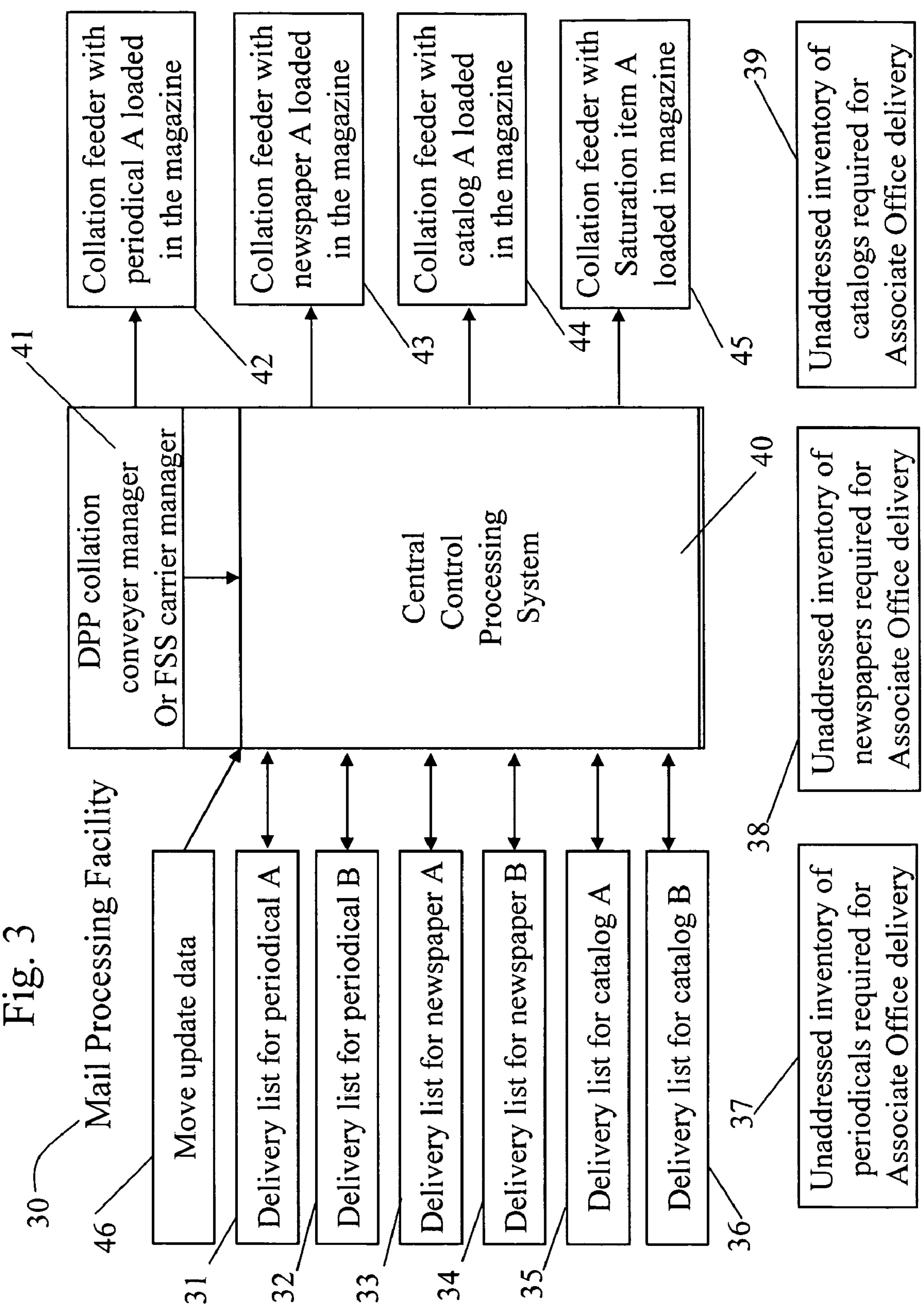
FIG. 3 is a block diagram of the control system for the data controlled collation feeder technology, wherein address lists, unaddressed mail items loaded into the feeders and the DPP collation track manager are integrated to perform the data controlled mail insertion.

The central control processing system (CCPS) 40 in FIG. 3 performs the tracking and control needed to enable data controlled collation. The CCPS receives delivery address lists 31 thru 36 from the mailer for each type of unaddressed mail 37 thru 39 that are due for processing during the current day. The number of mail types to be processed and the quantity of these mail types are only limited by the number of collation feeders designed into the system. The mailer could encrypt this address data with decryption codes exchanged electronically or manually input depending on the level of security that the mailer desires. Multiple modes of address data transfer are also possible. The data can be downloaded into secure storage in the CCPS, or the CCPS could query the mailer's database, provided real time response is available. The DPP operator will load each of the mail types 37 thru 39 into the collation feeders 42 thru 45 and input the data into the CCPS before starting the packaging run. The CCPS will use the DPP collation conveyer manager 41 which tracks which delivery point is at what location on the conveyer. The CCPS can then activate the collation feeders 42 thru 45 at the correct time to ensure that the flat mail piece is added to the correct delivery point stack on the conveyer.

Move update service 46 can be applied to the address data provided by the mailer. If the intended recipient has moved, the mail piece can be culled from delivery and the move update data provided to the mailer. This catches the error before delivery and enables the Postal Authority to add an additional for fee service—move update, address correction. Alternately, the move data can be electronically transferred to the DPP or FSS system at the correct DU if the required carrier route has not yet been processed and sufficient unaddressed pieces are available at that DU. In response to the transferred instruction, the system at the remote DU location will add the flat item into the mail intended for delivery at the recipient's new location. If it is no longer an option to include the forwarded item in the current processing run at the remote DU location, then the mailer has the option to send an individually addressed piece later based on the delivery confirmation data provided by the Postal Authority.

Figure 4:
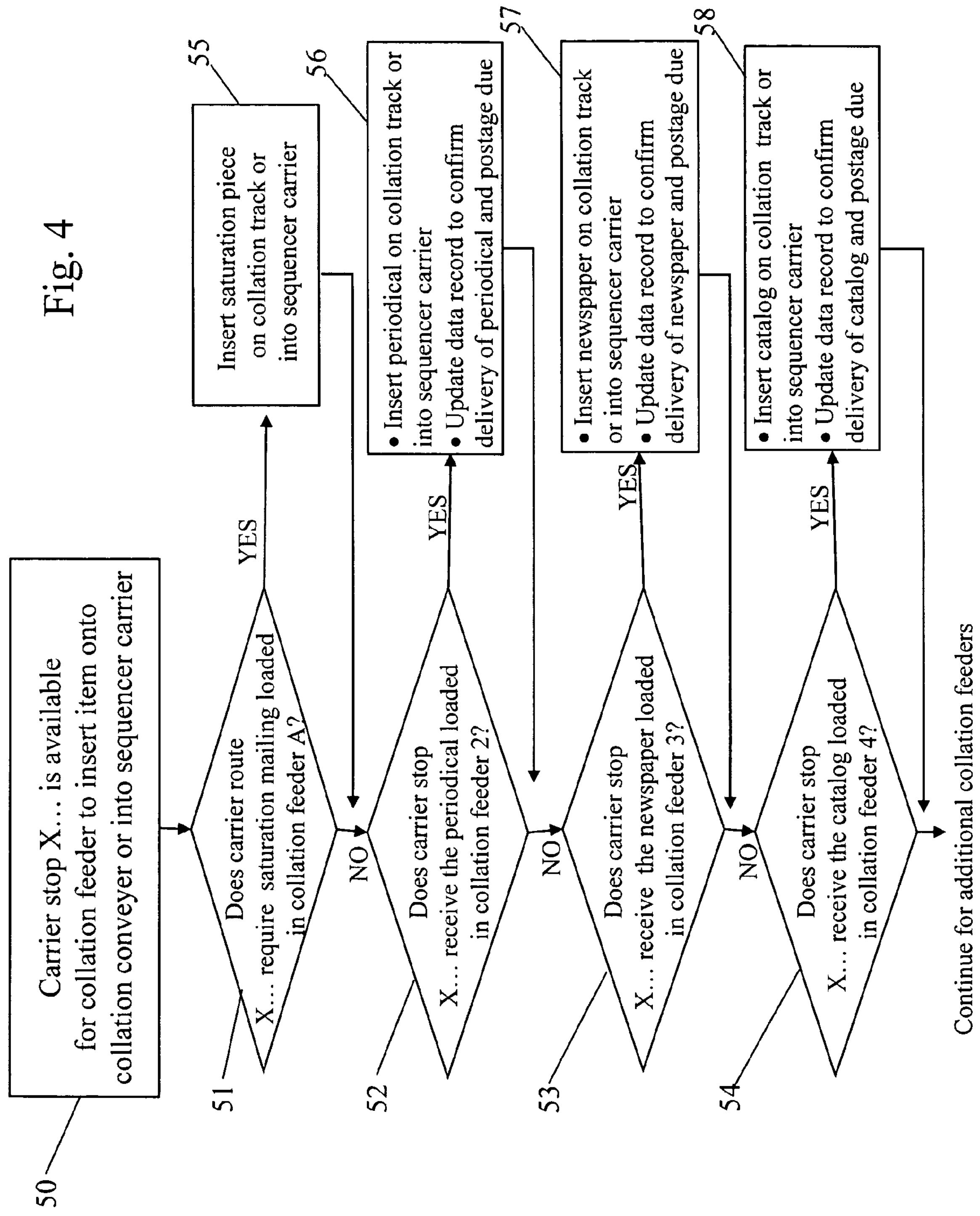
FIG. 4 illustrates a logic flow, for each stop on the DPP output conveyer or on the FSS carrier.

A series of logic steps are implemented as shown in FIG. 4 for each stop on a courier's delivery route. The CCPS knows which carrier is currently being processed and which carrier stop, delivery address, is at a given collation feeder input point 50. Using this tracking data, saturation mail for example would be added to every stop if carrier X was selected for these items 51. The selected collation feeder 55 would insert the piece onto the collation conveyer and record the event for billing and quality control.

If only selected stops are to receive a mail piece, then the address associated with the delivery stop is compared with the address list to determine if the collation feeder should add the mail piece to this delivery stop 52 on the collation conveyer. If this stop is selected, the piece will be inserted on the collation conveyer; and the data will be logged for calculation of postage due and for quality control needed to confirm delivery of the mail piece to the mailer 56. This data also is used to account for the utilization of all unaddressed mail pieces 37 or 38 that were delivered to the Postal Authority.

Some of the flat items such as periodicals and newspapers are based on a subscription, and residual items must be returned to the mailer or their destruction certified. The mailer will be invoiced by the CCPS or financial system based on the actual pieces processed and delivered.

These steps are repeated for each mail type to be processed and for each collation feeder as shown in steps 53 and 54 plus 57 and 58.

Marriage Mail, Saturation Mail, Advo Type Advertisements

These mail types are generally for all stops on the carrier's route and are frequently not addressed or barcoded. If the mail is for all stops, the control system 40 only needs to ensure that an empty spot on the collation track exists for those stops that did not have any collated mail from the prior stages of the DPP machine. The feeder will then perform an insertion for each stop position when it passes the feeder.

The Postal Authority will have the ability to provide new services for saturation-type customers and provide the direct mail services that direct mailers provide today. The delivery package that the DPP will produce can be considered a new hybrid envelope. Instead of placing advertising inserts into an envelope and then into the package, the Postal Service could act as a direct mailer and place the advertising insert directly into the package without an envelope. Thus, the DPP collation feeder concept could provide customers with an enhanced value added service and improved overall service and reduce cost for advertising customers. Newspaper companies are currently targeting implementation of a similar service via their insert package strategy.

Periodicals, Catalogs and Addressed Mail

The class of mail including periodicals and catalogs is normally addressed at the mail preparation factory and is difficult to automate also will benefit from this technology. Periodicals and catalogs for example are normally addressed, barcoded (or will be soon), sorted and bundled at the factory. An additional step of shipping the pallets of bundles to a consolidation center is performed to maximize postage discounts by qualifying of higher levels of sortation. All of these steps can be eliminated with the data controlled collation in association with or as part of the delivery route sequence sorting.

The computer controlling the collation feeder will be programmed with a customer's address list sorted by carrier and walk sequenced 31 thru 36. It is envisioned that the address list will be encrypted since it is typically customer confidential. The decryption key will be used at the individual feeder versus the DPP control level for added security. The decrypted data will be limited to a list of carrier stops that are to receive the mail in question. Any type of querying of the customer's data in an attempt to decode that address list will be blocked. The DPP collation subsystem will be controlled to ensure that empty spots are provided on the collation conveyer if no other mail is going to the stop in question. The mail piece will be added to the collation pile before packaging if that stop is programmed to receive the item.

The customer can now ship the correct number of periodicals or catalogs 37 thru 39 directly to the delivery Processing & Distribution Center (P&DC) or could have the Postal Authority ship the material between P&DCs if the customer wants to use the Postal Authority transportation network. In either case the delivery P&DC will have a sufficient number of items on hand to meet the delivery requirements for the day. Additional material could be stored at the P&DC, if it was in the best interest of Postal Authority and the customer to have material on hand in advance.

The address does not need to be printed on the piece since the data driven collation feeder will ensure that only the correct stops receive the item. The DPP operator only needs to load the Collation Feeder with the necessary material at the start of the DPP run and keep the hopper full. The DPP control system knows which Delivery Unit (DU) is being processed and which carrier is being collated so that the Collation Feeder can receive the necessary control parameters.

The fee structure will be determined in the future, since there are considerable savings for both the Postal Authority and the customers. The Postal Authority does not have to process the items when received (inbound) at the P&DC, since the collation will be handled when the mail is packaged for the DU, which eliminates a significant level of processing. The address recognition reading plus the POSTNET barcode reading are eliminated for a very difficult class of mail that has a lot of imaging clutter on the face. This will eliminate the use of Remote Barcode Service to resolve addresses from a mail piece image, delivery errors due to miss reads and damage during inbound processing. Move updates can be immediately fed into the control system by customer list updates or from local data. The customer has the option to provide some additional items to account for spoilage provided the Postal Authority destroys all residual mail pieces.

The benefits to the customer include no need to maintain address and barcode printing systems or the associated verification equipment (either inline or MERLIN). Individually addressed reprints are not needed in the case of damage. Only the correct total number of pieces per P&DC is needed. There is no need to build carrier route or zip break bundles and bind the bundles. The customers can palletize the material based on transportation mode, theirs or Postal Authorities.

Postage would be assessed based on the number of pieces fed by the Collation Feeder on the DPP or FSS machine. This data would be correlated with the customer's shipping quantity and address lists, to ensure accuracy. The data regarding number of flat pieces fed from the DPP would be encrypted for protection of confidentially and postage accuracy.

Alternate Approach for Lower Volume Identical Mailing

If the volume of mail pieces is too small to justify using a dedicated Collation Feeder, the pieces can be introduced to the DPP at any feeder station. The processes identified above for mail preparation, distribution to the P&DC and address list data management remain the same. When the mail is to be processed, the operator will be required to select the specific mail type on the feeder control panel. The associated address list for the item will be loaded into the DPP control system and the feeder start will be enabled. Since the DPP control system tracks every mail piece's position in the racking system, only the mail groupings for the correct carrier stops will receive the mail piece. When all of the pieces have been fed that are required for a DU, the feeder will stop and the operator will be notified to remove the mail pieces and save them for the processing of subsequent DUs. The operator can then enter normal operation (addressed mail) or select another special processing run.

Flats Sequencing System (FSS)

An alternative to installing the collation feeders and associated control technology on a DPP system is to install them on a carrier sequencing machine, such as the Flats Sequencing System (FSS). FIG. 5 is the schematic for an FSS type system 60. The FSS system sequence sorts flats, some using conventional techniques and some using collation instruction-based control similar to that in the DPP example. The FSS 60 has flat mail feeders 62 and flat collation feeders 66 that input mail pieces into an input section 61. The feeders 62 and 66 may be the same as or similar to the feeders discussed above, or the FSS may use other conventional flat feeder equipment. The feeders 62 feed flats in a conventional manner. The feeders 66, however, feed flats in accord with collation instructions, as processed by the central control processing system (CCPS) 63.

The FSS input section uses a series of moving carriers that will hold one mail piece which is inserted into the carrier when it passes the feeder input location. The CCPS 63 has the address data for the inserted item either from a barcode reader or from an OCR. The mail piece is transported in the carrier into the sorting and mail tub insertion section 65. Based on CCPS control, the mail piece is inserted into the correct mail tub to put all of the mail into carrier walk sequence. Since the FSS frequently will not have a tub location for each carrier stop, the sequencing is done in multiple steps, which requires re-feeding of the mail. A finished collection of mail in a tub will include groupings of mail pieces for stops on a carrier's route. The groupings will be in the desired stop sequence order, e.g. walk sequence order or linear sequence order. For each stop for which mail pieces are sorted in the current run, the grouping may include one or more flats from feeders 62 and/or one or more collated flats from feeders 66. Other types of mail (non-flats) may be fed and sorted by means added to the illustrated system, but typically, the non-flat mail-pieces are sequence sorted on separate equipment. Sequence sorted flats and sequence sorted non-flats may be merged, or they may be handled separately.

On the final pass, when the mail will be stacked into the mail carrier mail tubs 64 in carrier sequence, the collation feeders 66 will be activated by the CCPS 63 to insert a mail piece into the carrier 61 so that the saturation piece or unaddressed piece will be placed into the mail tub in the correct order for delivery. The control process is basically the same as depicted in FIGS. 3 and 4.

The FSS implementation will add flats in accord with collation instructions and provide improvements and/or new services substantially the same as the DPP example discussed above. Hence, one skilled in the art should fully appreciate operation in the FSS implementation without further discussion here.

Computer/Software Control

As shown by the above discussion, aspects of the mail processing are controlled by a processing system, 17, 40 or 63 in the various examples. The system automatically controls mail processing, for example, to receive and apply collation instructions regarding desired delivery of flats to mail stops on a delivery route of a mail carrier. The control system uses the received instructions to control the automatic feeder that supplies the flats to the automatic sorting system, and typically, the system controls other elements of the DPP or FSS type sequence sorting system. The control system causes the feeder to add the flats during sorting of the mail, so as to include one of the flats in each of a plurality of the mail piece groupings within the sorted stop-sequence mail.

Typically, the control processor system is implemented by one or more programmable data processing devices, and the programming of the device determines how it operates. The hardware elements operating systems and programming languages of such devices are conventional in nature, and it is presumed that those skilled in the art are adequately familiar therewith. However, it may help some readers to briefly consider an example.

Figure 6:
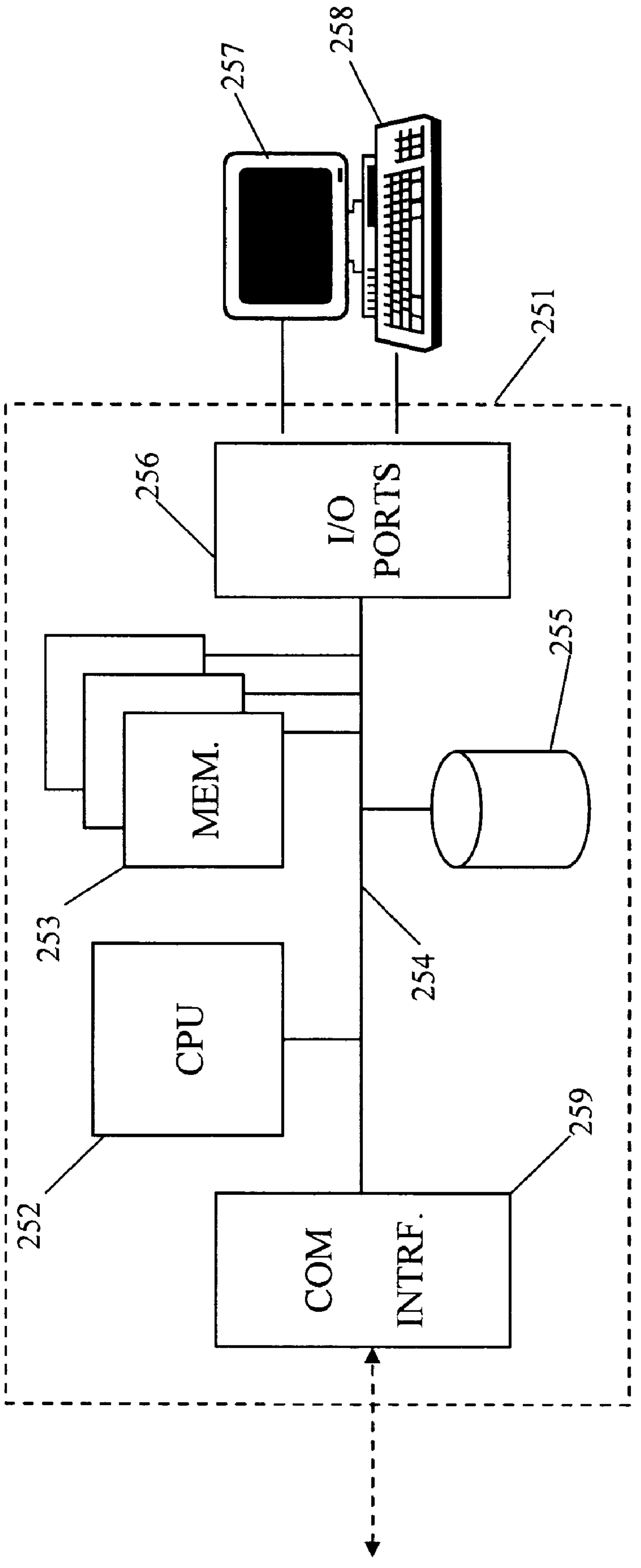
FIG. 6 is a high-level functional block diagram of an exemplary computer, which may serve as the central control processing system.

FIG. 6 is a functional block diagram of a PC based implementation of a data processing system 251, which may serve as the control system 17, 40 or 63 The exemplary system 251 contains a central processing unit (CPU) 252, memories 253 and an interconnect bus 254. The CPU 252 may contain a single microprocessor (e.g. a Pentium microprocessor), or it may contain a plurality of microprocessors for configuring the CPU 252 as a multi-processor system. The memories 253 include a main memory, such as a dynamic random access memory (DRAM) and cache, as well as a read only memory, such as a PROM, an EPROM, a FLASH-EPROM, or the like. The system 251 also includes mass storage devices such as various disk drives, tape drives, etc. In operation, the main memory stores at least portions of instructions for execution by the CPU 252 and data for processing in accord with the executed instructions.

The mass storage may include one or more magnetic disk or tape drives or optical disk drives, for storing data and instructions for use by CPU 252. For example, at least one mass storage system 255 in the form of a disk drive or tape drive, stores the operating system and various application software as well as data, such as received flats collating instructions and tracking or postage data generated in response to the collating and sorting operations. The mass storage 255 within the computer system 251 may also include one or more drives for various portable media, such as a floppy disk, a compact disc read only memory (CD-ROM), or an integrated circuit non-volatile memory adapter (i.e. PC-MCIA adapter) to input and output data and code to and from the computer system 251.

The system 251 also includes one or more input/output interfaces for communications, shown by way of example as an interface 259, for data communications with one or more collation feeders and/or the hardware element(s) of the particular sorting system. Although not shown, one or more such interfaces may enable communications via a network, e.g. to enable receiving collating instructions electronically and/or to enable reporting of delivery tracking and or postage accounting information to the mailer(s). These communications also enable transfer of a collation/delivery instruction to a remote location, e.g. to reflect an intended recipient's move to a region served by a remote postal delivery unit. The physical communication links may be optical, wired, or wireless.

The computer system 251 may further include appropriate input/output ports 256 for interconnection with a display 257 and a keyboard 258 serving as the physical elements for the user interface for the sorting and collation equipment. For example, the computer may include a graphics subsystem to drive the output display 257. The output display 257, for example, may include a cathode ray tube (CRT) display, or a liquid crystal display (LCD) or other type of flat panel display device. Although not shown, a PC type system implementation typically would include a port for connection to a printer. The input control devices for such an implementation of the system 251 would include the keyboard 258 for inputting alphanumeric and other key information. The input control devices for the system may further include a cursor control device (not shown), such as a mouse, a touchpad, a trackball, stylus, or cursor direction keys. The links of the peripherals 257, 258 to the system 251 may be wired connections or use wireless communications.

The computer system 251 runs a variety of applications programs and stores data, enabling one or more interactions via the user interface, provided through elements such as 257 and 258, and/or over a network (not shown) to implement the desired processing for the mail sorting and flat collation operations and any related tracking or postal accounting functions.

The components contained in the computer system 251 are those typically found in general purpose computer systems. Although illustrated as a PC type device, those skilled in the art will recognize that the class of applicable computer systems also encompasses systems used as servers, workstations, network terminals, and the like. In fact, these components are intended to represent a broad category of such computer components that are well known in the art.

Hence aspects of the techniques discussed herein encompass hardware and programmed equipment for controlling the relevant mail processing as well as software programming, for controlling the relevant functions. A software or program product may take the form of code or executable instructions for causing a computer or other programmable equipment to perform the relevant data processing steps relating to controlling sorting, controlling flat mail collation, tracking items delivered or accounting for postage, where the code or instructions are carried by or otherwise embodied in a medium readable by a computer or other machine. Instructions or code for implementing such operations may be in any form (e.g. source code, object code, interpreted code, etc.) stored in or carried by any readable medium.

Terms relating to computer or machine "readable medium" that may embody programming refer to any medium that participates in providing code or instructions to a processor for execution. Such a medium may take many forms, including but not limited to non-volatile media, volatile media, and transmission media. Non-volatile media include, for example, optical or magnetic disks, such as any of the storage device(s) 255 or any ROMs used in the computer system 251 illustrated in FIG. 6. Volatile media include dynamic memory, such as main memory. Transmission media include coaxial cables; copper wire and fiber optics including the wires that comprise a bus 254 within a computer system. Transmission media can also take the form of electric or electromagnetic signals, or acoustic or light waves such as those generated during data communications. In addition to storing programming in one or more data processing elements, various forms of computer readable media may be involved in carrying or communicating one or more sequences of one or more instructions to a processor for execution, for example, to install appropriate software in a system 251 intended to serve as the central control processing system.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a number of acronyms to refer to various services, messages and system components. Although generally known, use of several of these acronyms is not strictly standardized in the art. For the convenience of the reader, the following list correlates terms to acronyms, as used in the detailed description above.

Bar Code Recognition (BCR)
Cathode Ray Tube (CRT)
Central Control Processing System (CCPS)
Central Processing Unit (CPU)
Compact Disc Read Only Memory (CD-ROM)
Delivery Point Packaging (DPP)
Delivery Unit (DU)
Dynamic Random Access Memory (DRAM)
Electrically Programmable Read Only Memory (EPROM)
Flats Bundle Collator (FBC)
Flats Sequencing System (FSS)
Liquid Crystal Display (LCD)
Optical Character Recognition (OCR)
Personal Computer (PC)
Personal Computer—Memory Card International Association (PC-MCIA)
Processing & Distribution Center (P&DC)
Programmable Read Only Memory (PROM)
Random Access Memory (RAM)
Read Only Memory (ROM)

What is claimed is:

1. A method of automatically controlling mail processing, comprising:

feeding a stream of unaddressed mail flats by an automatic feeder to an automatic sorting system;

receiving an address data file containing information that defines mail stops on a delivery route of a mail carrier;

generating feeder and collation instructions based on the received address data file; and controlling the automatic feeder for feeding the unaddressed mail flats to the automatic sorting system, to add the unaddressed mail flats during sorting of mail, so as to include one of the unaddressed mail flats in each of a plurality of groupings of sorted stop-sequence mail, corresponding to the received address data file, each stop-sequence grouping comprising one or more mail pieces intended for delivery to each of a plurality of the mail stops on the delivery route of the mail carriers, wherein the received address data file identifies a sub-set but not all of the mail stops on the carrier's route, and the controlling causes the automatic inclusion of one of the unaddressed mail flats in each grouping of mail intended for delivery to a respective mail stop in the identified sub-set.

2. The method of claim 1, further comprising validating each received address from the address data file before controlling the feeder to enable insertion of an unaddressed mail flat into the grouping of mail intended for the mail stop corresponding to the received address.

3. A method of automatically controlling mail processing, comprising:

receiving collation instructions regarding desired delivery of flats to mail stops on a delivery route of a mail carrier, the received collation instructions being separate from any material included in or printed on the flats, wherein the receiving of the collation instructions comprises receiving an address file containing addresses of the mail stops in the sub-set;

controlling an automatic feeder for feeding the flats to an automatic sorting system, to add the flats during sorting of the mail, so as to include one of the flats in each of a plurality of groupings of sorted stop-sequence mail, based on the received collation instructions, each grouping comprising one or more mail pieces intended for delivery to each of a plurality of the mail stops on the delivery route of the mail carrier;

detecting an address in the received file for which a resident has moved to a new delivery location;

identifying an address of the resident at the new delivery location; and forwarding an instruction to a remote facility to collate into a bundle for delivery at the new delivery location by another mail carrier, wherein:

the collation instructions identify a sub-set but not all of the mail stops on the carrier's route; and the controlling causes the automatic inclusion of one of the flats in each grouping of mail intended for delivery to a respective mail stop in the sub-set identified by the instructions.

4. The method of claim 1, further comprising counting number of the unaddressed mail flats added to the groupings of mail.

5. The method of claim 4, further comprising reporting the number of the unaddressed mail flats added to the groupings to a mailer of the unaddressed mail flats as verification of delivery.

6. A method of automatically controlling mail processing, comprising:

receiving collation instructions regarding desired delivery of unaddressed mail flats to mail stops on a delivery route of a mail carrier, the received collation instructions being separate from any material included in or printed on the unaddressed mail flats;

controlling an automatic feeder for feeding the unaddressed mail flats to an automatic sorting system, to add the unaddressed mail flats during sorting of the mail, so as to include one of the unaddressed mail flats in each of a plurality of groupings of sorted stop-sequence mail, based on the received collation instructions, each grouping comprising one or more mail pieces intended for delivery to a sub-set but not all of a plurality of the mail stops on the delivery route of the mail carrier, the sub-set being defined by the received collation instructions;

counting number of the unaddressed mail flats added to the groupings of mail; and accounting for a postage charge for delivery of the unaddressed mail flats based on the number of the unaddressed mail flats added into the groupings of mail.

7. The method of claim 1, further comprising:

receiving additional collation instructions regarding desired delivery of other unaddressed mail flats to the mail stops on the delivery route of the mail carrier, the received additional collation instructions being separate from any material included in or printed on the other unaddressed mail flats; and controlling the automatic feeder for feeding the additional unaddressed mail flats to the automatic sorting system, based on the received additional collation instructions, to add the additional unaddressed mail flats during sorting of the mail, so as to add one of the additional unaddressed mail flats in each of a plurality of groupings of sorted stop-sequence mail.

8. A computer programmed to implement the method of claim 1.

9. A software product comprising: executable instructions for causing a computer to perform the method of claim 1, and a machine readable medium bearing the instructions.

* * * * *

UNITED STATES PATENT AND TRADEMARK OFFICE

CERTIFICATE OF CORRECTION

PATENT NO. : 7,659,487 B2
APPLICATION NO. : 11/150295
DATED : February 9, 2010
INVENTOR(S) : Conard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 844 days.

Signed and Sealed this

Thirtieth Day of November, 2010

David J. Kappos

*Director of the United States Patent and Trademark Office*